United States Patent
Sato et al.

(10) Patent No.: US 6,676,179 B2
(45) Date of Patent: Jan. 13, 2004

(54) FRONT STRUCTURE OF VEHICLE BODY

(75) Inventors: Kenichi Sato, Tokyo (JP); Tatsuya Morimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/819,016

(22) Filed: Mar. 28, 2001

(65) Prior Publication Data

US 2001/0026072 A1 Oct. 4, 2001

(30) Foreign Application Priority Data

Mar. 30, 2000 (JP) ........................................ 2000-092795

(51) Int. Cl.$^7$ ................................................ B60R 19/52
(52) U.S. Cl. ........................................ 293/115; 293/121
(58) Field of Search ..................... 296/109, 115, 296/121, 146, 194; 293/115, 117, 110, 24, 109, 120, 121, 155, 132; 123/41.48; 165/41, 69; 180/68.3, 68.6

(56) References Cited

U.S. PATENT DOCUMENTS

| | | | |
|---|---|---|---|
| 2,062,315 A | | 12/1936 | Jandus ........................ 293/55 |
| 3,869,165 A | * | 3/1975 | Miller |
| 3,869,167 A | * | 3/1975 | Muller ........................ 293/110 |
| 3,917,332 A | * | 11/1975 | Puleo ........................ 293/109 |
| 4,348,042 A | * | 9/1982 | Scrivo ........................ 293/120 |
| 4,566,407 A | * | 1/1986 | Peter ........................ 123/41.48 |
| 5,066,057 A | * | 11/1991 | Furuta et al. ................ 293/121 |
| 5,311,963 A | * | 5/1994 | Shigeoka et al. |
| 5,409,288 A | * | 4/1995 | Masuda ........................ 293/155 |
| 5,573,299 A | | 11/1996 | Masuda ........................ 296/194 |
| 6,106,039 A | * | 8/2000 | Maki ........................ 293/132 |
| 6,155,335 A | * | 12/2000 | Acre et al. ..................... 165/41 |
| 6,224,120 B1 | * | 5/2001 | Eipper et al. ................ 293/115 |
| 6,260,609 B1 | * | 7/2001 | Takahashi ..................... 165/69 |
| 6,412,581 B2 | * | 7/2002 | Enomoto et al. ............. 165/69 |
| 6,428,065 B2 | * | 8/2002 | Sato et al. ................... 293/121 |
| 6,447,049 B1 | * | 9/2002 | Tohda et al. ................. 293/117 |
| 6,540,275 B1 | * | 4/2003 | Iwamoto et al. .............. 293/24 |
| 2001/0027883 A1 | * | 10/2001 | Sasano et al. ............. 180/68.3 |
| 2002/0129981 A1 | * | 9/2002 | Satou ........................ 180/68.6 |
| 2002/0190542 A1 | * | 12/2002 | Takeuchi et al. ............ 296/194 |

FOREIGN PATENT DOCUMENTS

| | | | |
|---|---|---|---|
| JP | 1 168544 | * | 7/1989 |
| JP | 11-78732 | | 3/1999 |

* cited by examiner

*Primary Examiner*—Kiran Patel
(74) *Attorney, Agent, or Firm*—Smith, Gambrell & Russell, LLP

(57) ABSTRACT

A bumper 10 is extendedly provided in a width direction of a vehicle in front of a radiator panel 40 having an upper frame 41 and a lower frame 42 both extendedly provided in the width direction of the vehicle at a front part of the vehicle body. The bumper 10 comprises an upper part bumper 20 which has an upper side impact absorbing material 22 provided between an upper side bumper beam 21, extendedly provided in the width direction of the vehicle above the lower frame 42, and a bumper face 23, and a lower part bumper 30 which has a lower side impact absorbing material 32 provided between the lower frame 42 of the radiator panel 40, extendedly provided below the upper part bumper 20, and a bumper face 23.

7 Claims, 8 Drawing Sheets

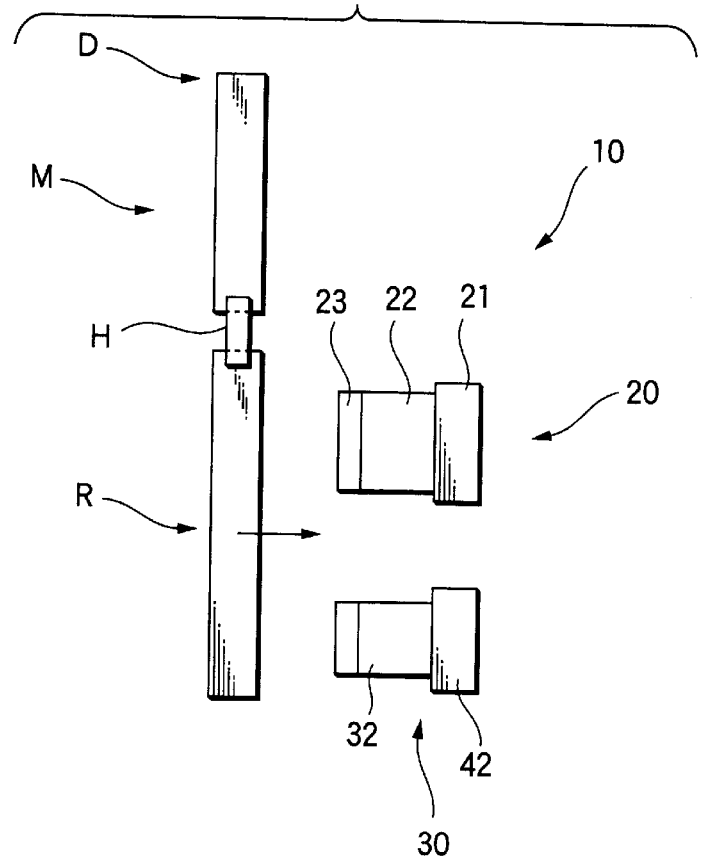
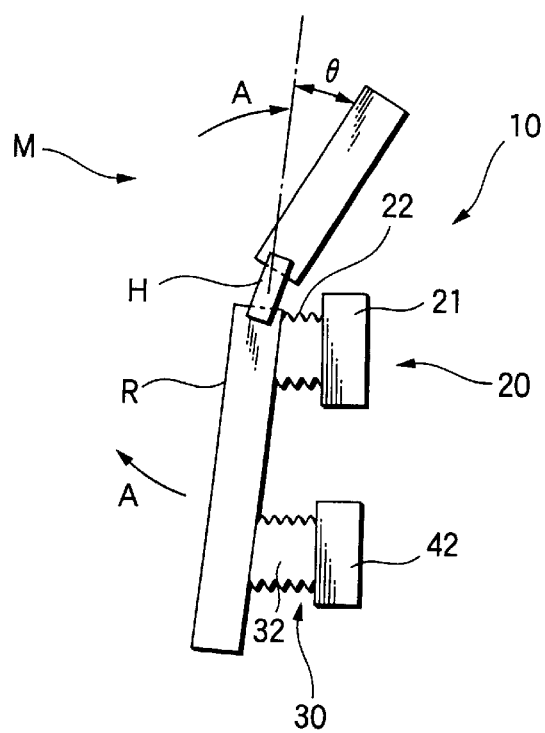

FRONT STRUCTURE OF VEHICLE BODY

BACKGROUND OF THE INVENTION

1. Field of the Invention

The present invention relates to a front structure of a vehicle body, which is to enhance the safety of a pedestrian when the vehicle running at a low speed has a minor collision with the pedestrian.

2. Description of the Related Art

In recent years, there have been proposed front structures of vehicles in each of which protection of a pedestrian is taken into consideration when the vehicle running at a low speed has a minor collision with the pedestrian.

For example, as disclosed in Japanese Patent Unexamined Publication No. Hei. 11-78732 and shown in FIGS. 9 to 11, a front structure of vehicle has an upper side bumper beam 102 and a lower side bumper beam 103. The front face of the upper side bumper beam 102 is covered with a bumper face 101 made of flexible resin. The upper side bumper beam 102 is extended in a width direction of the vehicle at a front part of a vehicle body. The upper side bumper beam 102 and the lower side bumper beam 103 are supported by a radiator panel 106 at the front part of the vehicle body through an upper side bumper stay 104 and a lower side bumper stay 105, respectively.

The upper side bumper stay 104 has a double structure constituted of a long outer pipe stay 107, and a short inner pipe stay 108. The long outer pipe stay 107 is secured to both of the upper side bumper beam 102 and the radiator panel 106. The short inner pipe stay 108 is secured only to the radiator panel 106. The outer pipe stay 107 is constituted of a front side stay 107a having a higher strength and a rear side stay 107b having a lower strength. The front side stay 107a is expanded toward its front end side, as shown in FIG. 10.

Furthermore, the lower side bumper stay 105 is secured to the lower side bumper beam 103 with its front end side, and to the radiator panel 106 with its rear end through a bracket (not illustrated). The upper side bumper stay 104 has a strength in the longitudinal direction determined to be lower than that of the lower side bumper stay 105.

Then, when the vehicle running at a low speed has a minor collision with a pedestrian M as schematically shown in FIG. 10 illustrating a state before the collision and in FIG. 11 after the collision, for example, the upper side bumper beam 102 abuts against a lower limb R near a knee H and the lower side bumper beam 103 abuts against a lower part of the lower limb R.

At this time, the low strength rear side stay 107b of the upper side bumper stay 104 supporting the upper side bumper beam 102 is compressed to be crushed and deformed, and the lower side bumper stay 105 itself is compressed to be crushed and deformed, which relieves an impact. In such a case, the upper side bumper stay 104, having the strength determined to be lower than that of the lower side bumper stay 105, is more largely deformed. This produces a force acting to turn the lower limb R of the pedestrian in directions indicated by arrows A as shown in FIG. 11, that is, in the direction of scooping up an under part of the lower limb R. Thus produced force reduces a bending angle θ appeared at the knee H to reduce the impact load imposed on the knee H. This appropriately controls behavior of the lower limb R at the collision to bring reduction in the load on the knee H.

In the above structure, for a large impact force, it is provided so that both of the front side stay 107a having a high strength and the inner pipe stay inside stay 108 are compressed to be crushed and deformed.

According to the above Japanese Patent Unexamined Publication No. Hei. 11-78732, protection of a leg of a pedestrian, particularly of the knee which is susceptible to be damaged, is provided when a vehicle running particularly at a low speed has a minor collision with the pedestrian.

In the above bumper structure, the upper side and lower side bumper stays 104 and 105 are disposed at a spot near each of the right and left ends of the vehicle. Therefore, when the pedestrian M comes into a minor collision with the upper side and lower side bumper beams 102 and 103 near the upper side and lower side bumper stays 104 and 105, for example, the rear side stay 107b and the lower side bumper stay 105 are compressed to be crushed and deformed to exhibit required performance. However, when the pedestrian M is collided with near the central part of each of the upper side and lower side bumper beams 102 and 103, a force due to an imposed load is distributed to the upper side and lower side bumper stays 104 and 105 at each of the right and left ends. This possibly makes the rear side stay 107b and the lower side bumper stays 105 less compressed to be slightly crushed and deformed to prevent them from exhibiting the required performance.

In addition, there is fear that the reduced strength of the upper side bumper stay 104 accompanies reduction in rigidity for supporting the upper side bumper beam 102 to make a sufficient bumper function unachievable when a large impact load is exerted.

Furthermore, the lower bumper beam 103 placed in front of the radiator panel 106 necessitates conserving a space therefor to restrict design flexibility of the front part of the vehicle. Along with this, it is feared that increased number of parts leads to increases in manufacturing cost and parts stock control cost.

SUMMARY OF THE INVENTION

Accordingly, it is an object of the present invention to provide a front structure of a vehicle body which can provide the design flexibility of the front part of a vehicle and reduction in the number of parts, and along with this, can obtain a sufficient bumper function and sufficient reduction of damage of the pedestrian.

In order to achieve the above object, the front structure of a vehicle body according to the invention, comprises a bumper and a radiator panel. The radiator panel has an upper frame and a lower frame both extendedly provided in the width direction of the vehicle at a front part of the vehicle body. The bumper is extendedly provided in a width direction of the vehicle in front of the radiator panel. The bumper comprises an upper side bumper beam extendedly provided in the width direction of the vehicle above the lower frame, an upper part bumper extendedly provided in the width direction of the vehicle and having an upper side impact absorbing material provided between the upper side bumper beam and an upper bumper face, the lower frame of the radiator panel, and a lower part bumper extendedly provided in the width direction of the vehicle and having an lower side impact absorbing material provided between the lower frame and an lower bumper face.

In the above-mentioned structure, the lower and upper bumper faces are integrally formed as a sole bumper face unit.

According to the invention, by forming the lower part bumper with the lower side impact absorbing material provided between the lower frame of the radiator panel and the bumper face, in providing the bumper having the upper part bumper and the lower part bumper both extendedly provided in the width direction of the vehicle at a front part of the vehicle body, the lower frame of the radiator panel is allowed to function as a bumper beam of the lower part bumper. This necessitates no space for separately providing a bumper beam of the lower part bumper to ensure the design flexibility of the front part of the vehicle. Along with this, the number of parts is reduced to allow the structure to achieve lightweight with a simplified constitution.

Furthermore, the upper side impact absorbing material and the lower side impact absorbing material, extendedly provided along the upper side bumper beam constituting the upper part bumper and the lower frame, respectively, have approximately the same cross-sectional profile at any arbitrary position in the width direction of the vehicle. This can ensure a uniform bumper function.

In the structure according to the present invention, it is advantageous that, the radiator panel is made inclined so that a front face of the radiator panel is faced up.

According to the above-mentioned structure, by making the radiator panel inclined, a highly rigid structure such as a hood locking device disposed above the radiator panel can be shifted toward the rear of the vehicle body. Along with this, it becomes possible to incline the front part of the vehicle body, which can control the behavior of a lower limb of a pedestrian when the vehicle has a minor collision with the pedestrian while running at a low speed to reduce damage of the pedestrian.

In the structure according to the present invention, it is advantageous that, the lower side impact absorbing material has a strength against a longitudinal load higher than that of the upper side impact absorbing material.

According to the above-mentioned structure of the present invention, when a vehicle running at a low speed has a minor collision with the pedestrian, the upper part bumper butts the lower limb near a knee and the lower part bumper beam butts a lower part of the lower limb. However, the lower side impact absorbing material, having a strength against a longitudinal load higher than that of the upper side impact absorbing material, is compressed to be crushed and deformed with an amount smaller than that of the upper side impact absorbing material. This makes the lower part bumper push the lower part of the lower limb to scoop it up, and makes the upper part bumper relatively moves the lower limb near the knee backward to provide the whole lower limb a turning force to reduce an impact load on the knee. Therefore, a bending angle appeared at the knee can be made small to allow damage particularly to the knee to be reduced.

In the structure according to the present invention, it is advantageous that, the lower part bumper is provided with a top end position of the bumper face thereof being set ahead of a top end position of the bumper face of the upper part bumper.

According to the above-mentioned structure of the present invention, the top end of the lower part bumper is positioned ahead of the top end of the upper part bumper. Therefore, when a pedestrian has a minor collision with the bumper, the lower part bumper first butts a lower part of the lower limb, and then, the upper part bumper butts the lower limb near a knee. This can provide the lower limb a turning force to allow damage to the knee to be reduced.

The above-mentioned object can also be achieved by, according to the present invention, a front structure of a vehicle body having a radiator panel extendedly provided in a width direction of a vehicle with a radiator mounted thereon and having structures disposed near an upper end of the radiator panel in a front end part of a hood, the radiator panel is made inclined relative to a vertical direction so that a front face of the radiator panel is faced up.

According to the invention as described above, by making the radiator panel inclined relative to a vertical direction, a highly rigid structure such as a hood locking device disposed at the front end of a hood can be shifted toward the rear of the vehicle body. Along with this, it becomes possible to incline the front part of the vehicle body, which can control the behavior of a lower limb of a pedestrian when the vehicle running at a low speed has a minor collision with the pedestrian to reduce damage of the pedestrian.

Note that the above-mentioned object can also be attained by a front structure of a vehicle body, according to the present invention comprising:

a radiator panel including an upper frame and a lower frame which are extended in a width direction of the vehicle body and are located at a front part of the vehicle body in a longitudinal direction of the vehicle body;

a bumper extended in the width direction of the vehicle body and located in front of the radiator, the bumper including, an upper side bumper beam extended in the width direction of the vehicle body and located a position higher than the lower frame of the radiator in a vertical direction, an upper part bumper extended in the width direction of the vehicle body and having an upper bumper face and an upper side impact absorbing material provided between the upper side bumper beam and the upper bumper face, and a lower part bumper extended in the width direction of the vehicle body and having an lower bumper face and a lower side impact absorbing material provided between the lower bumper face and the lower frame of the radiator, whereby the lower frame of the radiator operates a lower side bumper beam function.

Further, the above-mentioned object can further be achieved by a front structure of a vehicle body, according to the present invention, comprising:

a radiator panel extended in a width direction of the vehicle body and located at a front part of the vehicle body in a longitudinal direction of the vehicle body;

a front end part of a hood of the vehicle body including a rigid component which is located in the front end part, wherein the radiator panel is made inclined relative to a vertical direction so that a front face of the radiator panel is faced up.

BRIEF DESCRIPTION OF THE DRAWINGS

FIG. 5 is an explanatory diagram showing an operation of the bumper in the first embodiment of the front structure of the vehicle body;

FIG. 6 is an explanatory diagram showing the operation of the bumper in the first embodiment of the front structure of the vehicle body;

DETAILED DESCRIPTION OF THE PREFERRED EMBODIMENTS

First Embodiment

A first embodiment of the front structure of a vehicle body according to the present invention will be explained below with reference to FIG. 1 to FIG. 6.

Figure 1:
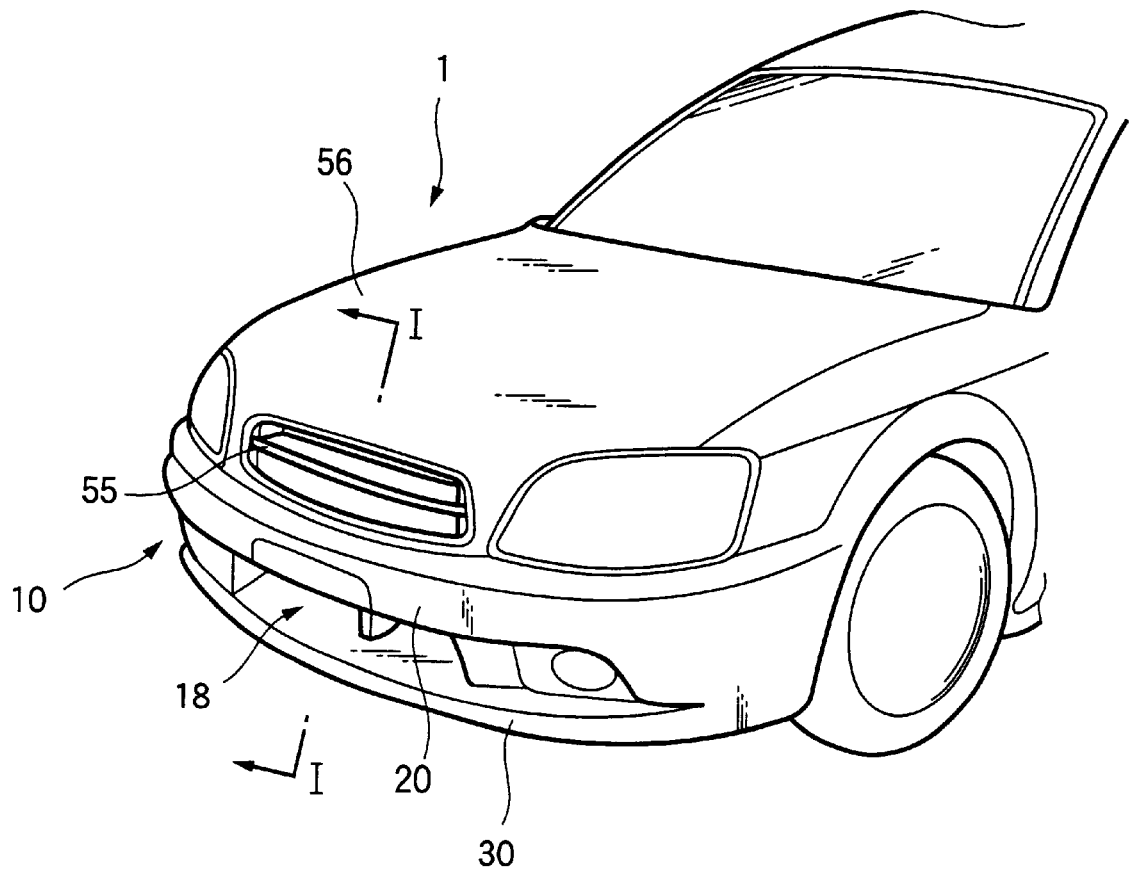
FIG. 1 is a perspective view showing a front part of a vehicle explaining a first embodiment of a front structure of a vehicle body according to the present invention.
Figure 2:
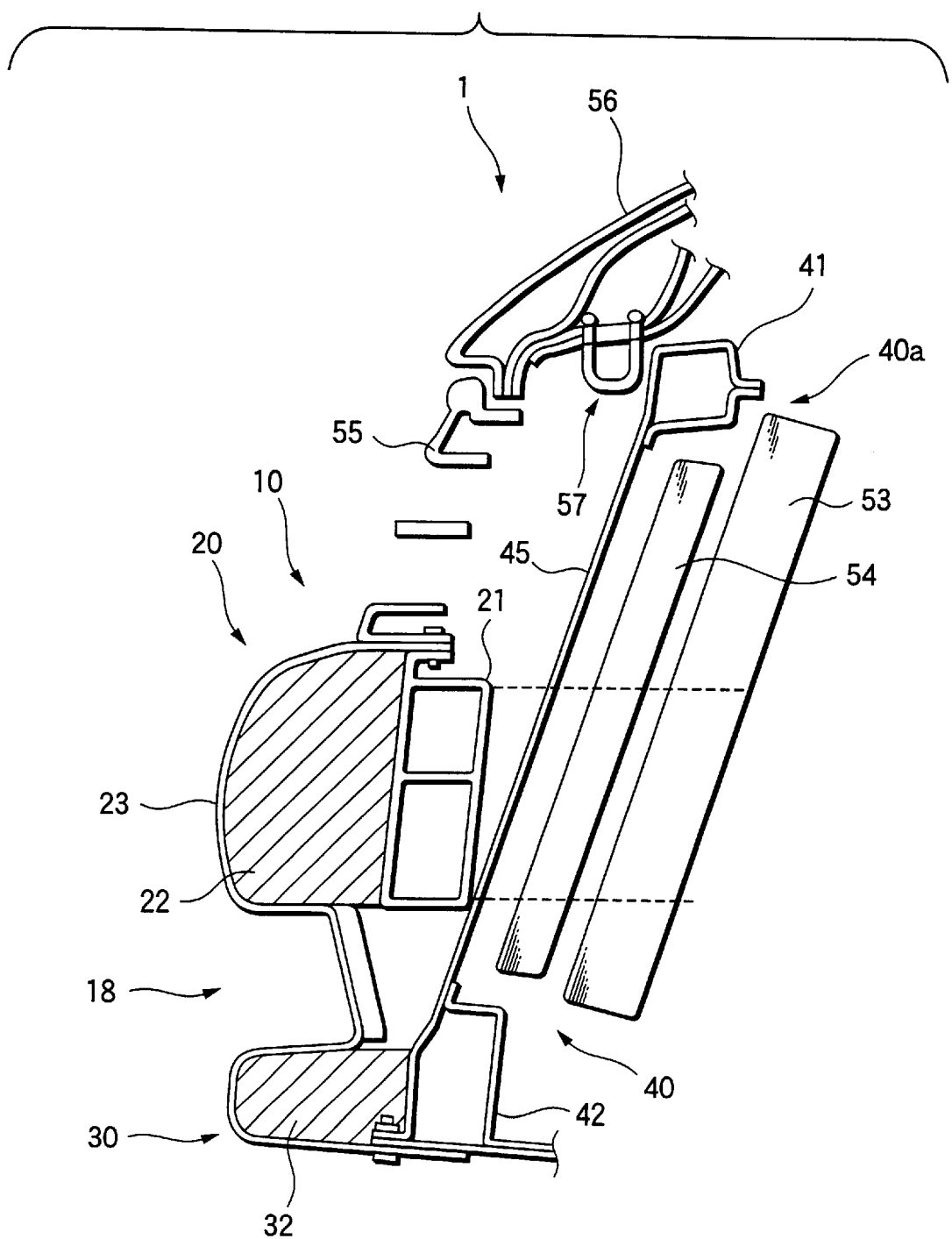
FIG. 2 is a view taken in the direction of the arrows along the line I—I in FIG. 1.

FIG. 1 is a perspective view showing a front part of a vehicle body, and FIG. 2 is a view taken in the direction of arrows along line I—I in FIG. 1.

A front structure of a vehicle body 1 has a bumper 10 and a radiator panel 40 disposed after the bumper 10. The bumper 10 comprises an upper part bumper 20 and a lower part bumper 30.

Figure 3:
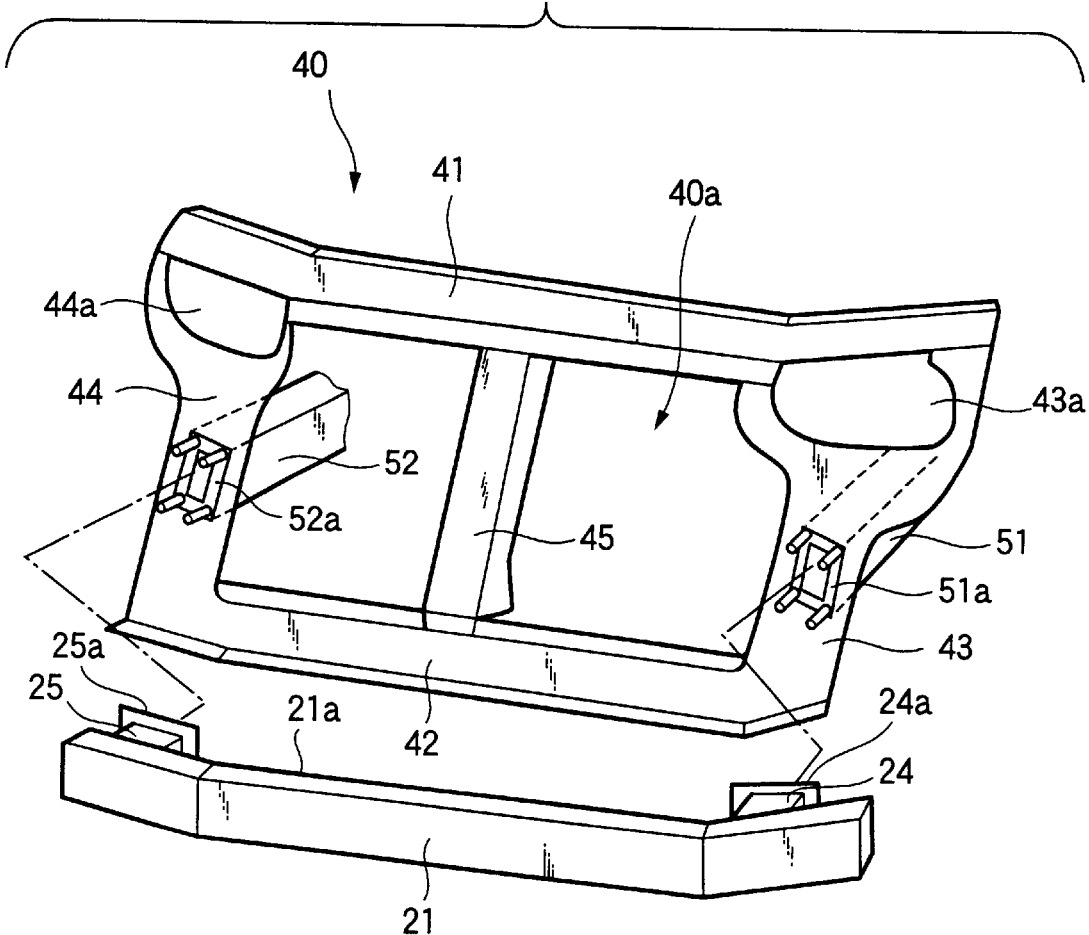
FIG. 3 is a perspective view showing a radiator panel and a bumper beam according to the first embodiment of the front structure of the vehicle body.

The radiator panel 40, as shown in FIG. 3 as a perspective view thereof, has an upper frame 41, a lower frame 42, and vertical frames 43 and 44. The vertical frame 43 connects left ends of the upper and lower frames 41 and 42. The vertical frame 44 connects right ends of the upper and lower frames 41 and 42. In a central part surrounded by the above frames, there is formed a radiator mounting space 40a. Furthermore, center portions of the upper frame 41 and the lower frame 42 are bridged by a stay 45.

At upper parts of the vertical frames 43 and 44 on the left and right, there are formed headlight mounting spaces 43a and 44a, respectively. Furthermore, at center portions of the vertical frames 43 and 44, there are connected front ends 51a and 52a of left and right side frames 51 and 52, respectively.

The upper part bumper 20 of the bumper 10 is formed by an side bumper beam 21 and an upper impact absorbing material 22 provided between the upper side bumper beam 21 and a bumper face 23. The upper bumper beam 21 and the upper impact absorbing material 22 are extendedly provided in the width direction of the vehicle. The lower part bumper 30 is formed by the lower frame 42 of the radiator panel 40 functioning as a lower bumper beam and a lower impact absorbing material 32 provided between the lower frame 42 and the bumper face 23. The lower frame 42 and the bumper face 23 are extending in the width direction of the vehicle.

The upper side bumper beam 21 constituting the upper part bumper 20 is shaped to have a hollow rectangular cross section and extends in the width direction of the vehicle. As shown in FIG. 3, onto a rear face 21a of each of the left and right ends of the upper side bumper beam 21, there is secured each of bumper beam stays 24 and 25 projected backward. Rear ends 24a and 25a of the bumper beam stays 24 and 25 are secured to the front ends 51a and 52a of the left and right side frames 51 and 52 connected to the radiator panel 40, respectively.

The lower frame 42 of the radiator panel 40 forming the lower part bumper 30 is shaped to have a hollow rectangular cross section and, as a reinforcing member, is extended in the width direction of the vehicle over the approximately whole width of the vehicle and arranged below the upper side bumper beam 21 approximately in parallel therewith with an appropriate clearance therefrom.

The bumper face 23 is an easily deformable member formed of material such as flexible resin and covers front faces of the upper side impact absorbing material 22 and the lower side impact absorbing material 32.

However, note that although in this embodiment the bumper face 23 located in front of the upper side impact absorbing material 32 and the bumper face 23 located in front of the lower side impact absorbing material 22 are integrally formed as a single bumper face unit, it is possible to provide the bumper face 23 as separated members for respective impact absorbing materials 22, 32.

The lower part bumper 30 is formed to have a height in a vertical direction smaller than that of the upper part bumper 20 and is disposed below the upper part bumper 20 with an air intake 18 provided between them.

Here, the lower part bumper 30 is constituted so that its amount of deformation is smaller than that of the upper part bumper 20 to the same load. Specifically, in a comparison between the lower side impact absorbing material 32 and the upper side impact absorbing material 22 about the strength against a longitudinal load, the strength of the lower side impact absorbing material 32 is determined so that it is larger than that of the upper side impact absorbing material 22.

For example, when forming the upper side and lower side impact absorbing materials 22 and 32 with foamed resin, a bubble diameter or an amount of foam per unit volume in the upper side impact absorbing material 22 is made larger than that in the lower side impact absorbing material 32. Furthermore, for example, when forming the upper side and lower side impact absorbing materials 22 and 32 with rubber, hardness of the rubber for the lower side impact absorbing material 32 is determined to be higher than that for the upper side impact absorbing material 22.

By thus forming the upper side and lower side impact absorbing materials 22 and 32, when impacts with the same amount of load are imposed on the upper part bumper 20 and the lower part bumper 30 from the front, the upper part bumper 20 becomes easy to be deformed, while the lower part bumper 30 becomes hard to be deformed.

On the radiator panel 40, as shown in FIG. 2, there are mounted a radiator 53 for cooling an engine and a condenser 54 for an air conditioner, inserted in the radiator mounting space 40a from the rear. To the radiator panel 40, a cooling fan (not illustrated) is further secured with bolts or the like so as to be positioned at the rear part of the radiator 53, and head lights (not illustrated) are mounted at the head light mounting spaces 43a and 44a.

In this embodiment, as shown in FIGS. 2 and 5, the position of the top end of the bumper face 23 as the position of the top end of the lower part bumper 30 is substantially aligned, in a line extending in a vertical direction, with the position of the top end of the bumper face 23 as the position of the top end of the upper part bumper 20.

The radiator panel 40, with the radiator 53, the condenser 54, the cooling fan, and the head lights being mounted, is installed at the front of the main vehicle body in an inclined position so that the front face thereof is faced up, namely, being inclined so that the upper part of the front face is positioned further backward.

Incidentally, reference numerals 55, 56, and 57 in FIG. 2 denote a front grille, a hood, and a hood locking device such as a striker (as a rigid components), respectively.

Furthermore, the lower frame 42 made function as a lower side bumper beam eliminates the lower side bumper beam to make it unnecessary to prepare the space for disposing the lower side bumper beam. The thus conserved space provides flexibility in designing the front part of the vehicle including the bumper 10, the radiator panel 40, and the like.

In addition, thus conserved space allows the radiator panel 40 to incline its front face so as to be faced up. Therefore, the lower frame 42 can be disposed forward, and the upper frame 41 can be disposed backward. This makes it possible to arrange a structure with high strength such as a hood lock device 57 backward which is arranged at the front end of the hood 56 near the upper frame 41.

Figure 4:
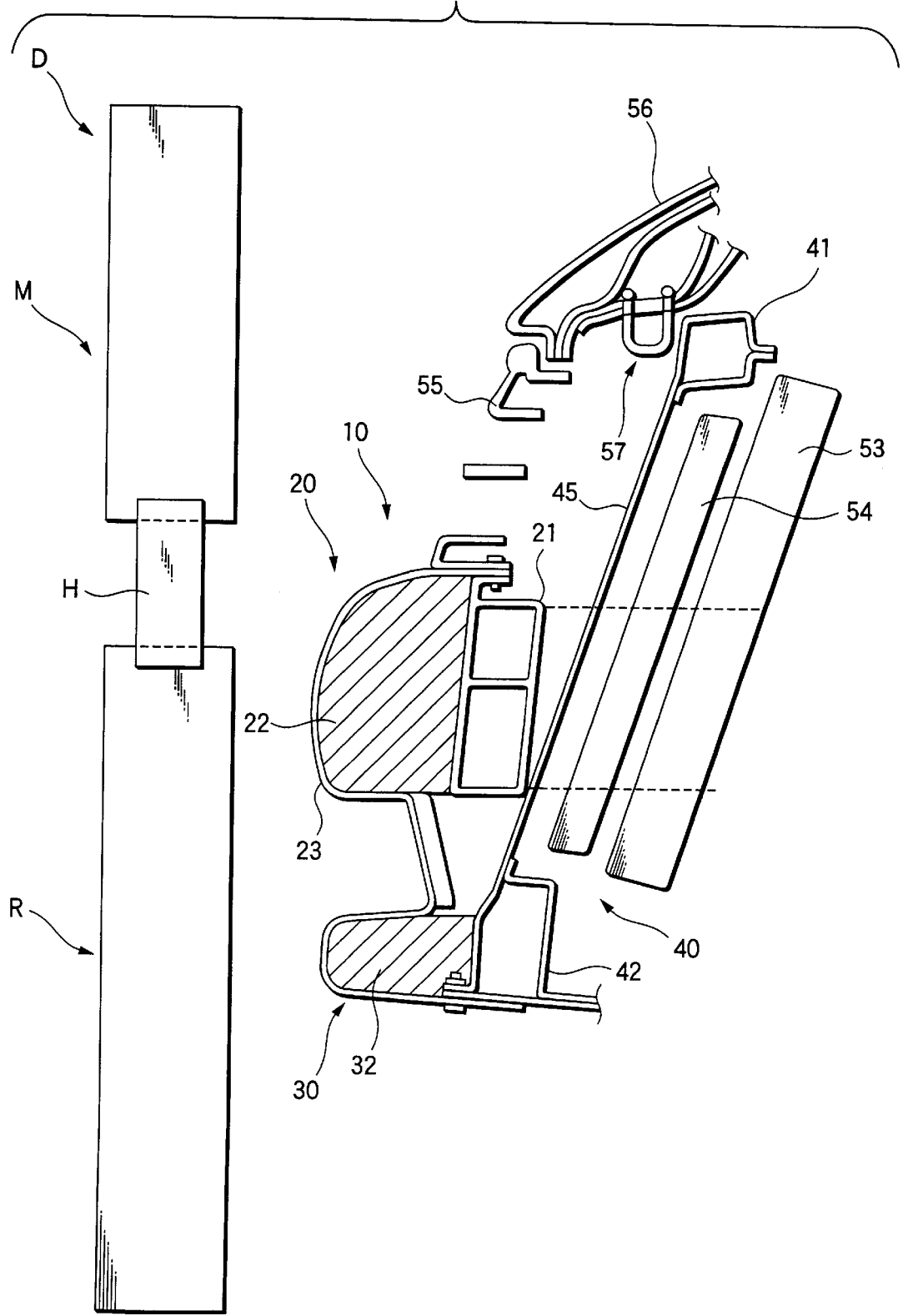
FIG. 4 is a view showing vertical positional relationship between a lower limb and a bumper according to the first embodiment of the front structure of the vehicle body.

In the next, operation and working effects of thus constituted front structure of a vehicle body will be explained with reference to FIG. 4, and FIG. 5 and FIG. 6 both schematically showing states before and after a minor collision, respectively. In the figures, illustration of components unnecessary for the explanation will be appropriately omitted.

When the vehicle running at a low speed has a minor collision with a pedestrian M, the upper side bumper 20 abuts against a lower limb R near a knee H. At the same time, the lower side bumper 30 abuts against a lower part of the lower limb R. At this time, the lower side impact absorbing material 32, having a strength against a longitudinal load higher than that of the upper side impact absorbing material 22, is compressed to be crushed and deformed with an amount smaller than that of the upper side impact absorbing material 22. This makes the lower part bumper 30 push the lower part of the lower limb R to scoop it up, and makes the upper part bumper 20 relatively move the lower limb R near the knee H backward to provide the whole lower limb R a turning force in a directions indicated by arrows A. This reduces an impact load on the knee H to allow a bending angle θ appeared at the knee to be made small.

In this way, by appropriately controlling behavior of the lower limb R at the collision, damage to the lower limb R, in particular damage to the knee H, can be reduced.

Moreover, each of the bumper face 23 constituting the upper part bumper 20, the upper side impact absorbing material 22 and the upper side bumper beam 21 is extendedly provided in the width direction of the vehicle with the structure at any arbitrary position in the width direction of the vehicle being the same. Also about the lower part bumper 30, the structure at any arbitrary position in the width direction of the vehicle is the same. This, even when the pedestrian M has a minor collision with the bumper 10 at any arbitrary position in the width direction of the vehicle, can effectively relieve damage given to the knee H.

Furthermore, the lower limb R of the pedestrian M, to which a turning force is given by the bumper 10 in the directions indicated by arrows A, contacts the vehicle with a thigh D over from the front grille 55 to the front end of the hood 56. However, as shown in FIG. 2, the front structure is formed to draw a smooth curve throughout from the front grille 55 to the front end of the hood 56, and the structure with a high strength such as the hood locking device 57 is arranged so that it is retreated backward. Therefore, an impact on the thigh D at the contact can be reduced.

Second Embodiment

Figure 7:
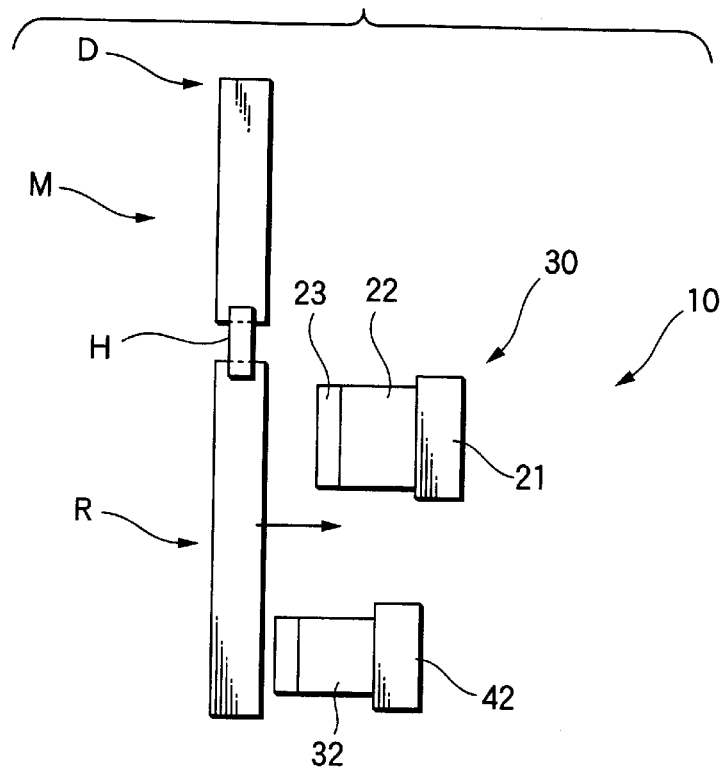
FIG. 7 is an explanatory diagram showing an operation of a bumper in a second embodiment of the front structure of the vehicle body according to the present invention.
Figure 8:
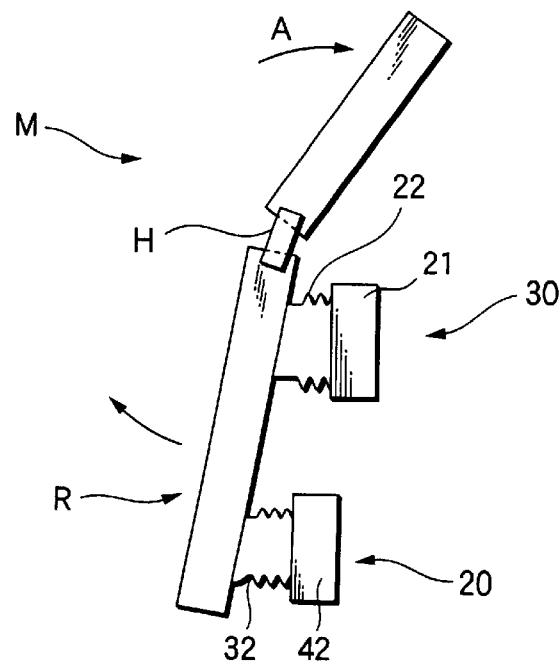
FIG. 8 is an explanatory diagram showing the operation of the bumper in the second embodiment of the front structure of the vehicle body.
Figure 9:
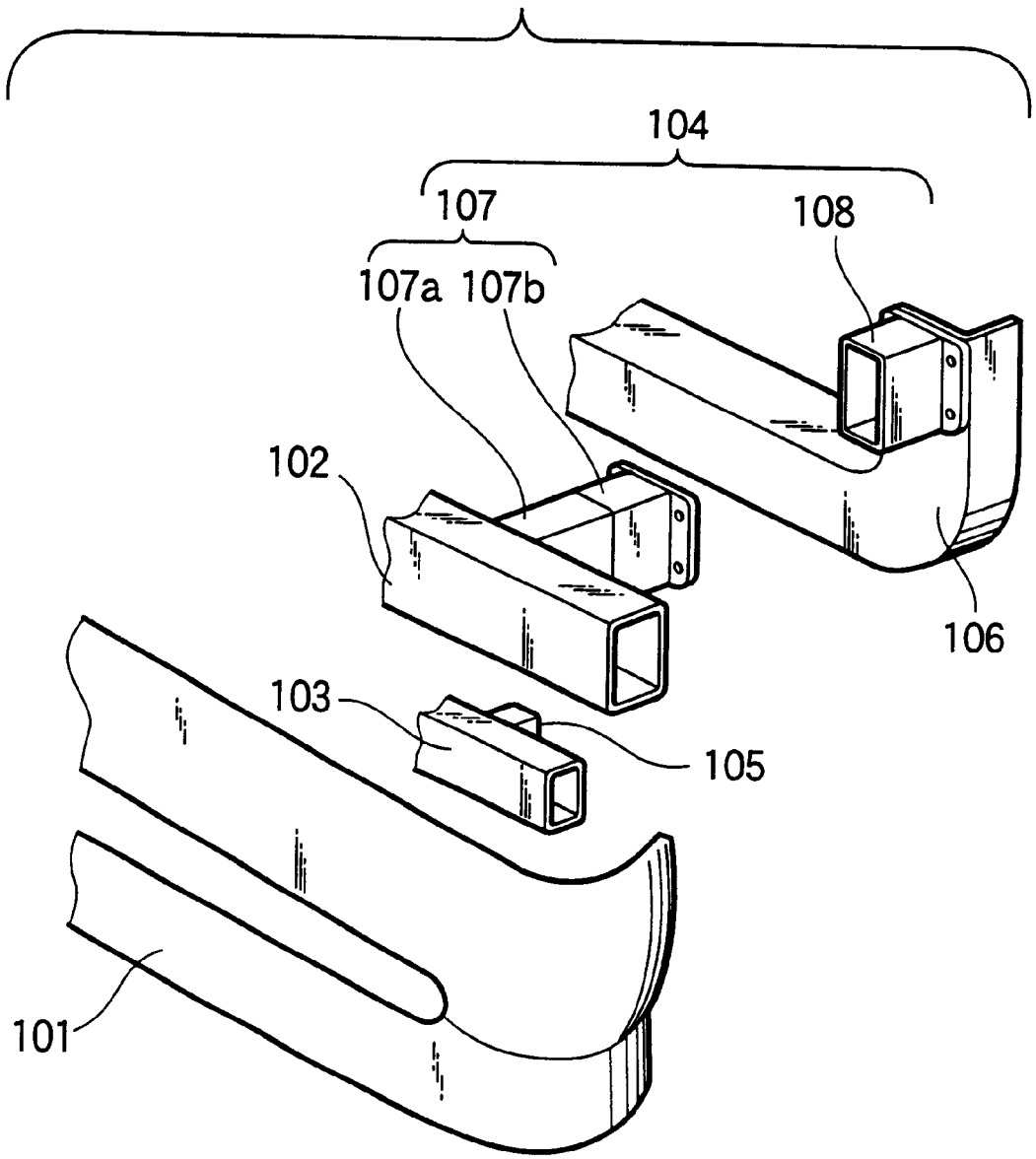
FIG. 9 is an exploded perspective view showing a bumper in the related art.
Figure 10:
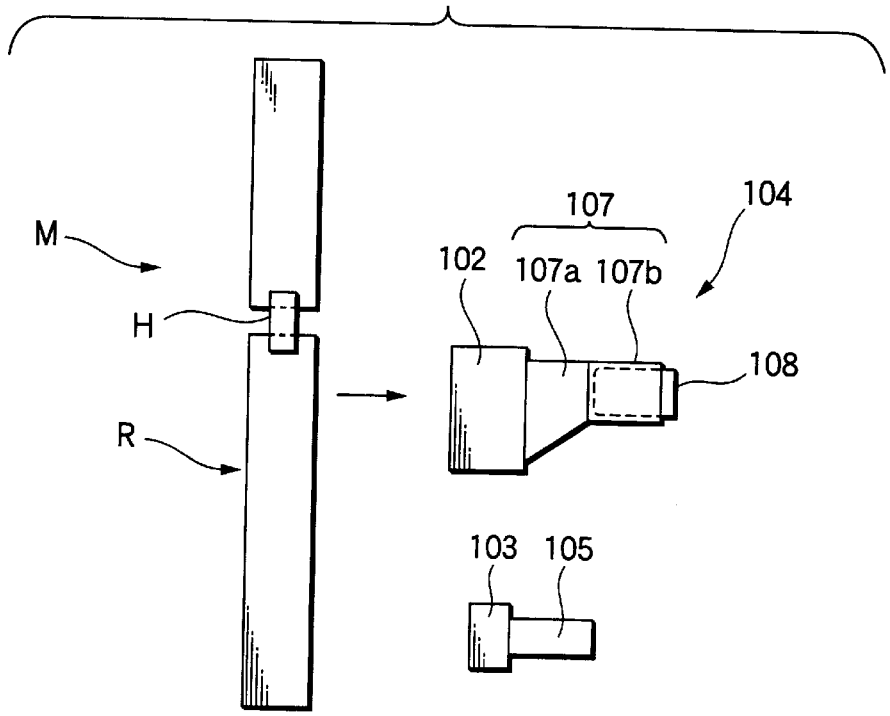
FIG. 10 is an explanatory diagram showing an operation of the bumper in the related art.
Figure 11:
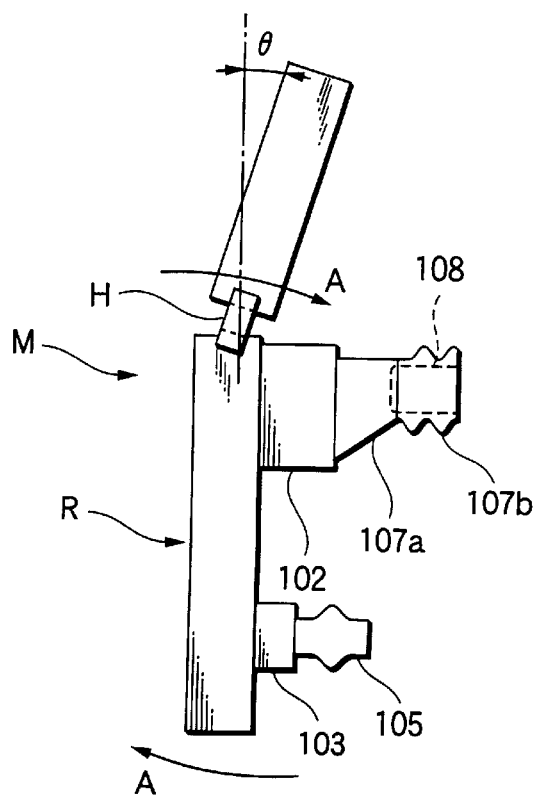
FIG. 11 is an explanatory diagram showing the operation of the bumper in the related art.

A second embodiment will be explained by FIG. 7 and FIG. 8.

In the second embodiment shown in the figures, the mode differs from the above first embodiment in that strengths of the upper side and lower side impact absorbing materials 22 and 32 against longitudinal impacts are determined to be the same, and the position of the top end of the bumper face 23 as the position of the top end of the lower part bumper 30 is set ahead of the position of the top end of the bumper face 23 as the position of the top end of the upper part bumper 20.

Also in the second embodiment, like in the above first embodiment, a turning force in the direction shown by the arrows A can be provided for the lower limb R. Namely, when the pedestrian M has a minor collision with the bumper 10, the lower part bumper 30 first abuts against the lower part of the lower limb R, and the upper part bumper 20 thereafter abuts against near the knee H. Therefore, like in the first embodiment, a turning force is provided for the lower limb R in the directions indicated by the arrows A.

This, like in the first embodiment, can appropriately control behavior of the lower limb R at the collision to reduce damage to the knee H. In addition, the upper part bumper 20 and the lower part bumper 30, each having the same structure at any arbitrary position in the width direction of the vehicle, can relieve damage given to the knee H even when the pedestrian M has a minor collision with the bumper 10 at any arbitrary position in the width direction of the vehicle.

It is to be understood that the present invention is not limited to the above modes and can be variously modified without departing from the spirit and scope of the invention. For example, explanations were made, in the first embodiment, about the case in which the strengths of the upper side and lower side impact absorbing materials 22 and 32 are different from each other in the longitudinal direction, and, in the second embodiment, about the case in which the top end position of the upper part bumper 20 is different from that of the lower part bumper 30. However these modes can be appropriately combined. Specifically, even with a strength difference between the upper side and lower side impact absorbing materials 22 and 32 made smaller than that in the first embodiment, and with a positional difference between the top ends of the upper part bumper 20 and the lower part bumper 30 set smaller, a turning force can be provided for the lower limb R of the pedestrian M to make it possible to assure a similar effect to that in the second embodiment.

Moreover, in each of the above modes, an explanation was made about the case in which the bumper 10 has the upper part bumper 20 and the lower part bumper 30. However, to position the radiator panel 40 made inclined so that the front face thereof is faced up can be also applied to a bumper without the lower part bumper 30. In this case, equivalent operation and working-effect can be also ensured. Namely, a structure with a high strength such as a hood locking 57 that can be disposed in being retreated makes it possible to ensure the operation and working effect of reducing damage on the lower limb R, particularly on the thigh D, of the pedestrian M.

By the above-explained front structure of a vehicle body according to the present invention, the lower frame of the radiator panel is made to function as a bumper beam. This necessitates no space for disposing the lower side bumper beam to expand flexibility in designing the front part of the vehicle body.

In addition, the radiator panel inclined with the front face being faced up makes the upper frame retreated from the lower frame. Therefore, a structure with a high strength and/or rigidity such as the hood locking device disposed near the upper frame can be arranged backward by an amount by which the upper frame is retreated. This can determine the shape of the top end of the vehicle body as a shape that can well control the behavior of the lower limb of the pedestrian when the vehicle running at a low speed has a minor collision with the pedestrian, and can further prevent the lower limb from being butted by the structure with a high strength such as the locking device. That is, it becomes possible to reduce damage on the lower limb of the pedestrian.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A front structure of a vehicle body comprising:

a radiator panel including an upper frame and a lower frame which are extended in a width direction of said vehicle body and are located at a front part of the vehicle body;

a bumper extending in the width direction of the vehicle body and located in front of said radiator panel, said bumper including;

an upper bumper beam located in a position higher than said lower frame;

an upper part bumper having an upper bumper face and an upper impact absorbing material provided between said upper bumper beam and said upper bumper face; and a lower part bumper having a lower bumper face, said lower frame functioning as a lower bumper beam and connected to said lower part bumper, and a lower impact absorbing material positioned on said lower frame;

said lower and upper bumper faces are substantially aligned with each other in a line extending in the vertical direction;

wherein said lower impact absorbing material is harder to deform than said upper impact absorbing material when subjected to the same load;

said upper impact absorbing material extending along said upper bumper beam; and said lower impact absorbing material extending along said lower frame.

2. The front structure according to claim 1, wherein said upper impact absorbing material extends in width direction of the vehicle body along said upper bumper beam, and said lower impact absorbing material extends in width direction of the vehicle body along said lower frame.

3. The front structure of a vehicle according to claim 1, wherein an air intake is located between said upper part bumper and said lower part bumper.

4. The front structure of a vehicle according to claim 1, wherein said upper frame is inclined with its upper end extending rearwardly in the longitudinal direction of said vehicle body relative to its lower end.

5. The front structure of a vehicle according to claim 1, wherein said upper part bumper and said lower part bumper have approximately the same cross-sectional profile in the width direction of the vehicle.

6. A front structure of a vehicle body comprising:

a radiator panel including an upper frame and a lower frame which are extended in a width direction of said vehicle body and are located at a front part of the vehicle body;

a bumper extending in the width direction of the vehicle body and located in front of said radiator panel, said bumper including;

an upper bumper beam located in a position higher than said lower frame;

an upper part bumper having an upper bumper face and an upper impact absorbing material provided between said upper bumper beam and said upper bumper face; and a lower part bumper having a lower bumper face, said lower frame functioning as a lower bumper beam and connected to said lower part bumper, and a lower impact absorbing material positioned on said lower frame;

wherein said lower impact absorbing material is harder to deform than said upper impact absorbing material when subjected to the same load;

and a front end part of a hood including a rigid component which is disposed near an upper end of said radiator panel;

wherein said radiator panel is installed inclined relative to a vertical direction;

said upper impact absorbing material extending along said upper bumper beam; and said lower impact absorbing material extending along said lower frame.

7. The front structure according to claim 6, wherein end positions of said lower and upper bumper faces in the longitudinal direction of the vehicle body are substantially aligned with each other in a line extending in the vertical direction.

* * * * *